D. EICHENFELD.
SUBIRRIGATION SYSTEM.
APPLICATION FILED FEB. 27, 1919.
1,333,296.
Patented Mar. 9, 1920.
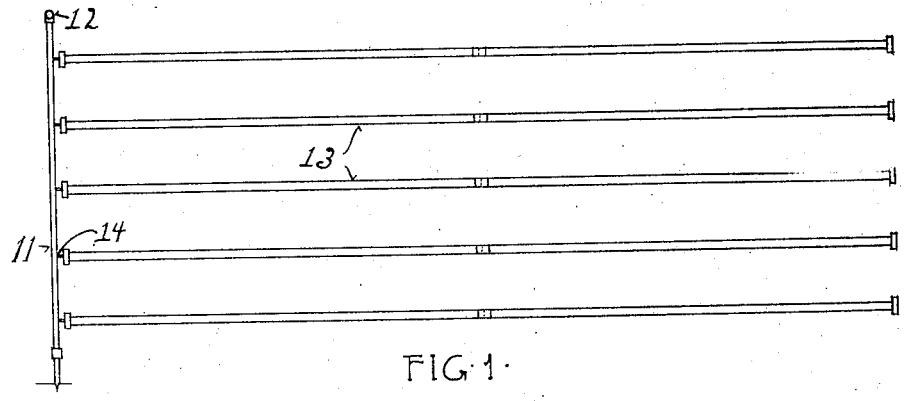
FIG. 1.
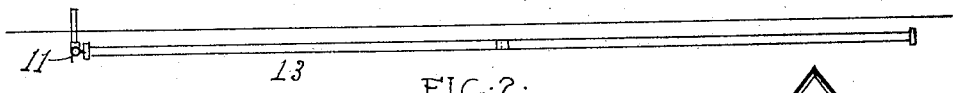
FIG. 2.
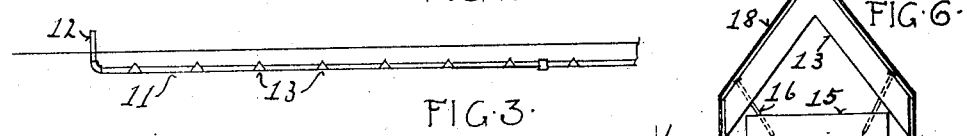
FIG. 3.
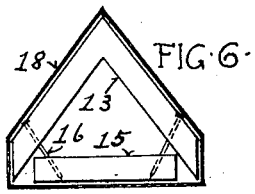
FIG. 6.
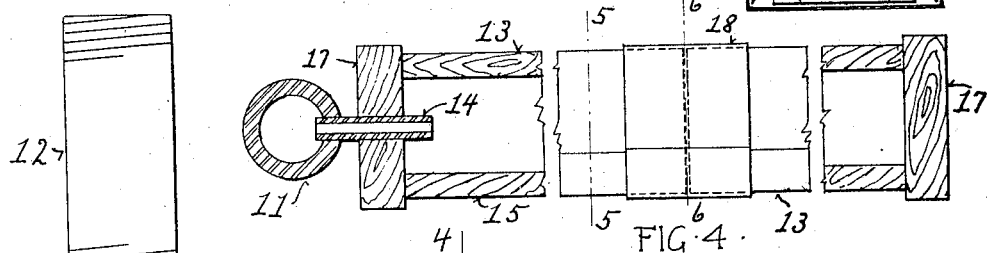
FIG. 4.
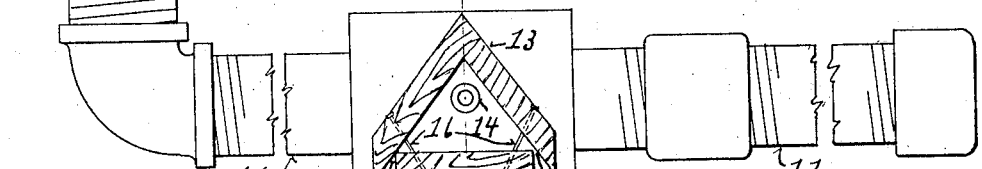
FIG. 5.
FIG. 9.   FIG. 10.
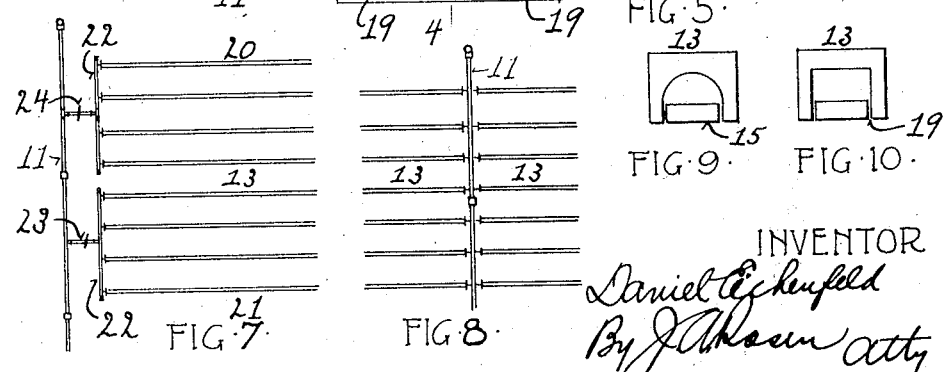
FIG. 7.   FIG. 8.
INVENTOR
Daniel Eichenfeld
By J. A. Rosen atty

UNITED STATES PATENT OFFICE.

DANIEL EICHENFELD, OF TULSA, OKLAHOMA.

SUBIRRIGATION SYSTEM.

1,333,296.  Specification of Letters Patent.  Patented Mar. 9, 1920.

Application filed February 27, 1919. Serial No. 279,623.

*To all whom it may concern:*

Be it known that I, DANIEL EICHENFELD, a citizen of the United States, residing at Tulsa, in the county of Tulsa and State of Oklahoma, have invented certain new and useful Improvements in Subirrigation Systems, of which the following is a specification.

My invention relates to a sub-irrigation system comprising a main supply pipe and laterals and adapted particularly, though not essentially, to small or household gardens.

Objects of my invention are: simplicity and economy in construction, so that the system may be made from materials easily obtainable and easily assembled and installed without special skill or tools; a system that will water the entire area to be irrigated instantly upon the introduction of water into the intake pipe; lateral pipes that will not clog up with dirt or roots nor detrimentally interfere with the growth of the roots of adjacent plants; and the provision of certain parts hereinafter enumerated.

My invention consists of certain structural features of the laterals; of the combination with the main supply pipe and the laterals, and of the parts, improvements and combinations hereinafter set forth and claimed.

In the drawings accompanying and forming part of this specification and in the description of the drawings I have shown my invention in its preferred form with some modifications and what I deem to be the best mode of applying the principles thereof; but it is to be understood that, within the scope of the appended claims, I contemplate changes in form, proportions and materials, the transposition of parts and the substitution of equivalent members, without departing from the spirit of my invention.

Figure 1 is a ground plan showing somewhat diagrammatically a sub-irrigation system embodying my invention. Fig. 2 is a longitudinal, and Fig. 3 is a cross sectional, elevation. Fig. 4 is a detail, being in part a side elevation of the splice and adjacent portion of the splice in the lateral, and in the remaining portion, broken away, a vertical sectional elevation on a plane indicated by the line 4—4 in Fig. 5. Fig. 5 is a cross sectional elevation on a plane indicated by the line 5—5 in Fig. 4; and Fig. 6 is a cross section on a plane indicated by the line 6—6 in Fig. 4. Figs. 7 and 8 are ground plans of modified forms of distribution; and Figs. 9 and 10 are end views of modified forms of the laterals.

Similar reference characters indicate like or corresponding parts throughout the several views.

The main supply pipe 11, provided with the intake 12, is connected with a series of laterals 13, 13 by means of small nipples 14, 14, whose aggregate cross-sectional area is less than the cross-sectional area of the main pipe.

The laterals are of particular construction. It comprises an inverted channel, preferably the inverted V-shape shown in Figs. 4, 5 and 6, forming its imperforate top and sides, and a bottom 15 secured thereto by means of small nails or brads 16, 16; end blocks 17, 17; and, where multiple sections are to be used, sleeves 18, 18 for splicing together the contiguous ends of adjacent sections. Preferably the channels, bottoms and end blocks are of wood, and the bottoms 15 may be common laths or slats. Through the end block next to the main supply pipe is extended the nipple 13, whereby the lateral is connected with the main supply pipe.

The parts described are easily obtainable on the market and no particular skill is required in assembling same, and it is the imperfect joining of the bottom with the sides that is depended on to afford cracks 19, 19, through which the water within the lateral will seep out and be absorbed by the adjacent soil; and these cracks will always be present because of the rough materials used and the impracticability of making a watertight joint of this kind. The top and sides being imperforate, there is no opportunity for the dirt to sift through or the roots to grow into the pipe and clog it; and the preferred inverted V-shape is especially adapted to divert the roots without stopping them.

The laterals are buried in the ground at a shallow depth—say four to six inches, and do not interfere with ordinary shallow cultivation. Preferably, too, they are spaced equidistantly apart in parallel relation over the entire area to be irrigated, the spacing to depend on local conditions; and, by splicing, they may be of any desired length.

Water is supplied to the system through the intake 12 in any manner, as by pouring it in by hand, or by connecting it with a source of supply such as a tank or a power water system, or spring, etc. Inasmuch as the flow capacity of the main supply pipe is greater than the capacity of all of the nipples, the main pipe may be kept filled with water during the flow and the water will flow into all of the laterals with substantial uniformity, thus insuring substantially uniform irrigation throughout the area irrigated.

In the modification shown in Fig. 7, there are two groups of laterals, 20 and 21, each group having a sub-main supply pipe 22 connected with the main supply pipe by nipple 23 and each provided with a valve or gate 24, whereby the two areas may be individually controlled. In Fig. 8 is shown a system in which the laterals extend from both sides of the main supply pipe.

The system may be easily taken up, stored and relaid wherever and whenever desired; and a given system may also easily be altered in size or arrangement.

Having thus described my invention, what I claim is:

1. In a sub-irrigation system, a supply pipe, and lateral pipes connected thereto, each lateral pipe being of inverted V-shape in cross-section with the lower edges thereof tapered to form pointed edges, and a connecting bottom strip extending between the lower tapered edges of the V-shaped pipe and spaced therefrom at its sides.

2. In a sub-irrigation system, a supply pipe, and lateral pipes connected thereto, each lateral pipe being of inverted V-shape in cross section with a flat bottom strip extending between the sides thereof and spaced therefrom, the bottom edges of the sides and lower wall of the bottom being substantially coextensive, and connecting means between the sides and bottom.

3. In a sub-irrigation system, a supply pipe, and lateral pipes connected thereto, each lateral pipe being of inverted V-shape in cross section with the lower edges thereof tapered to form pointed edges, a connecting bottom strip between the lower tapered edges of the V-shaped pipe and spaced therefrom at its sides, the lateral pipes being formed of sections having abutting ends, and sleeves inclosing the abutting ends.

DANIEL EICHENFELD.